US011403461B2

(12) United States Patent
Wright (10) Patent No.: US 11,403,461 B2
(45) Date of Patent: Aug. 2, 2022

(54) SYSTEM AND METHOD FOR REDACTING DATA FROM WITHIN A DIGITAL FILE

(71) Applicant: Redacture LLC, Portland, OR (US)

(72) Inventor: Erik James Wright, Portland, OR (US)

( * ) Notice: Subject to any disclaimer, the term of this patent is extended or adjusted under 35 U.S.C. 154(b) by 66 days.

(21) Appl. No.: 16/891,850

(22) Filed: Jun. 3, 2020

(65) Prior Publication Data

US 2021/0110107 A1 Apr. 15, 2021

Related U.S. Application Data

(60) Provisional application No. 62/856,390, filed on Jun. 3, 2019.

(51) Int. Cl.
*G06F 17/00* (2019.01)
*G06F 40/197* (2020.01)
*H04L 9/40* (2022.01)
*G06F 16/93* (2019.01)

(52) U.S. Cl.
CPC .......... *G06F 40/197* (2020.01); *G06F 16/93* (2019.01); *H04L 63/08* (2013.01)

(58) Field of Classification Search
CPC ......... G06F 40/197; G06F 16/93; H04L 63/08
See application file for complete search history.

(56) References Cited

U.S. PATENT DOCUMENTS

| 8,456,654 | B2 | 6/2013 | Kelly et al. | |
|---|---|---|---|---|
| 8,533,078 | B2 | 9/2013 | Schrichte | |
| 8,938,386 | B2 * | 1/2015 | Cumby | G06F 40/10 |
| | | | | 715/255 |
| 9,195,853 | B2 * | 11/2015 | Fox | G06F 21/6254 |
| 9,600,134 | B2 * | 3/2017 | Fox | G06F 21/6245 |
| 9,721,107 | B2 * | 8/2017 | Han | G06F 21/32 |
| 9,754,311 | B2 * | 9/2017 | Eisen | H04L 63/1466 |
| 9,767,086 | B2 * | 9/2017 | Vidhani | G06V 30/418 |
| 9,772,999 | B2 * | 9/2017 | Krishnan | G06F 16/338 |
| 9,875,369 | B2 * | 1/2018 | Libin | G06F 21/6209 |
| 9,892,278 | B2 * | 2/2018 | Avrahami | G06F 21/6254 |
| 9,948,629 | B2 * | 4/2018 | Eisen | H04L 63/1408 |
| 10,068,104 | B2 * | 9/2018 | Mullins | G06F 21/6227 |
| 10,089,287 | B2 * | 10/2018 | Rebstock | G06Q 10/00 |
| 10,108,306 | B2 * | 10/2018 | Khoo | G06F 3/048 |
| 10,372,799 | B2 | 8/2019 | Roks | |

(Continued)

*Primary Examiner* — Mohammed H Zuberi
(74) *Attorney, Agent, or Firm* — Volta Law Group (57) ABSTRACT

A system and method for providing a means for electronic redaction of visually or aurally discernible information without multiple authorship of information is disclosed. The system comprises a data selector for selecting a portion of content from within an original document for redaction, a data redactor for marking the portion of content from within the original document selected for redaction as being redacted and for generating a digital representation of the redacted data for maintaining the structure and layout of the original document when replacing the portion of content from within the original document selected for redaction, and an output document file rendered for generating a redacted document by replacing the selected content for redaction with the digital representation of the selected content within the document to generate a redacted document. The redacted document does not retain a recoverable version of the redacted content from the original document.

10 Claims, 7 Drawing Sheets

(56) References Cited

U.S. PATENT DOCUMENTS

| | | | |
|---|---|---|---|
| 11,144,668 B2* | 10/2021 | Jiang | G06F 21/84 |
| 11,144,669 B1* | 10/2021 | Rao | G06N 20/00 |
| 2005/0254483 A1* | 11/2005 | Factor | H04H 60/04 |
| | | | 370/352 |
| 2008/0204788 A1* | 8/2008 | Kelly | G06T 11/60 |
| | | | 358/1.15 |
| 2009/0019379 A1 | 1/2009 | Pendergast et al. | |
| 2011/0119576 A1* | 5/2011 | Aumann | G06F 16/1744 |
| | | | 715/255 |
| 2020/0403818 A1* | 12/2020 | Daredia | G10L 15/26 |

* cited by examiner

PROVISIONAL APPLICATION FOR PATENT
INVENTION TITLE

A means for electronic redaction of visually or aurally discernible information without multiple authorship of information.
BACKGROUND OF THE INVENTION
Problem Solved: Legal professionals regularly redact sensitive information from documents which must
be electronically delivered to interested parties. Due to the legal nature of these documents, the
professional must not alter the structure of the document, or make changes to the document such that
they would be a new author of the information contained within. Most commonly, a physical copy of
the document is made and large blotches of ink are applied to the areas of sensitive information.
Afterwards, the document is transformed back into an electronic copy via the use of a document scanner. This process costs the professional time and paper.

102 computational methods. This automatic removal of information usurps t he user's control of exactly
which information needs to be removed

401

Select   Redact   Unredact   Create Doc   Save   Configure   Login/Out 411      412      413        414          415    416        417

SYSTEM AND METHOD FOR REDACTING DATA FROM WITHIN A DIGITAL FILE

CROSS-REFERENCE TO RELATED APPLICATION

This application claims priority to U.S. Provisional Patent Application No. 62/856,390, titled "A Means for Electronic Redaction of Visually or Aurally Discernible Information Without Multiple Authorship of Information," and filed on Jun. 3, 2019. The entire application is incorporated herein by reference in its entirety.

TECHNICAL FIELD

This application relates in general to a system and method for providing redacting data from a digital file, and more specifically, to a system and method for providing a means for electronic redaction of visually or aurally discernible information without multiple authorship of information.

BACKGROUND

Legal professionals regularly redact sensitive information from documents which must be electronically delivered to interested parties. Due to the legal nature of these documents, the professional must not alter the structure of the document or make changes to the document such that he/she would be a new author of the information contained within. Most commonly, a physical copy of the document is made, and large blotches of ink are applied to the areas of sensitive information. Afterward, the document is transformed back into an electronic copy via the use of a document scanner. This process costs the professional time, money, and supplies. Some systems also will automatically remove selections that are implied through other statistical computational methods. This automatic removal of information usurps the user's control of exactly which information needs to be removed. Other tools do not allow for the selection of both aurally and visually discernible information. Other tools will not remove information permanently and irrecoverably. Other tools are incorporated into a suite of editing capabilities which may strip the document of its original authorship/integrity.

Therefore, a need exists for a system that provides complete binary removal of visually selected information such that it cannot be recovered, while not automatically removing inferred selections from a statistical computation, and does not allow for an edit that would alter the integrity of the document's authorship, all the while eliminating the need to create a physical copy of the original document.

SUMMARY

In accordance with the present invention, the above and other problems are solved by providing a system and method for a means for electronic redaction of visually or aurally discernible information without multiple authorship of information according to the principles and example embodiments disclosed herein.

In one embodiment, the present invention is a system for providing a means for electronic redaction of visually or aurally discernible information without multiple authorship of information. The system comprises a data selector for selecting a portion of content from within an original document for redaction, a data redactor for marking the portion of content from within the original document selected for redaction as being redacted and for generating a digital representation of the redacted data for maintaining the structure and layout of the original document when replacing the portion of content from within the original document selected for redaction, and an output document file rendered for generating a redacted document by replacing the selected content for redaction with the digital representation of the selected content within the document to generate a redacted document. The redacted document does not retain a recoverable version of the redacted content from the original document.

In another embodiment, the present invention is a method for providing a means for electronic redaction of visually or aurally discernible information without multiple authorship of information. The method uploads an original document to a redaction processor, selects content from within the original document for redaction, marks the selected content for redaction, generates a digital representation of the selected content for redaction, replaces the selected content for redaction with the digital representation of the selected content within the document to generate a redacted document, and downloading the redacted document from the redaction processor. The redacted document does not retain a recoverable version of the redacted content from the original document.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout.

DETAILED DESCRIPTION

This application relates in general to a system and method for redacting data from within a digital file, and more specifically, to a system and method for providing a means for electronic redaction of visually or aurally discernible information without multiple authorship of information according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly," consistent with the discussion above regarding ranges and numerical data.

The term "mobile application" refers to an application executing on a mobile device such as a smartphone, tablet, and/or web browser on any computing device.

The terms "customer," "client," and "user" refer to an entity, e.g. a human, using the system for redacting data from a digital file including any software or smart device application(s) associated with the invention. The term user herein refers to one or more users.

The term "connection" refers to connecting any component as defined below by any means, including but not limited to, a wired connection(s) using any type of wire or cable for example, including but not limited to, coaxial cable(s), fiberoptic cable(s), and ethernet cable(s) or wireless connection(s) using any type of frequency/frequencies or radio wave(s). Some examples are included below in this application.

The term "invention" or "present invention" refers to the invention being applied for via the patent application with the title "System and Method for Redacting Data from Within a Digital File." Invention may be used interchangeably with data redactor.

Figure 1:
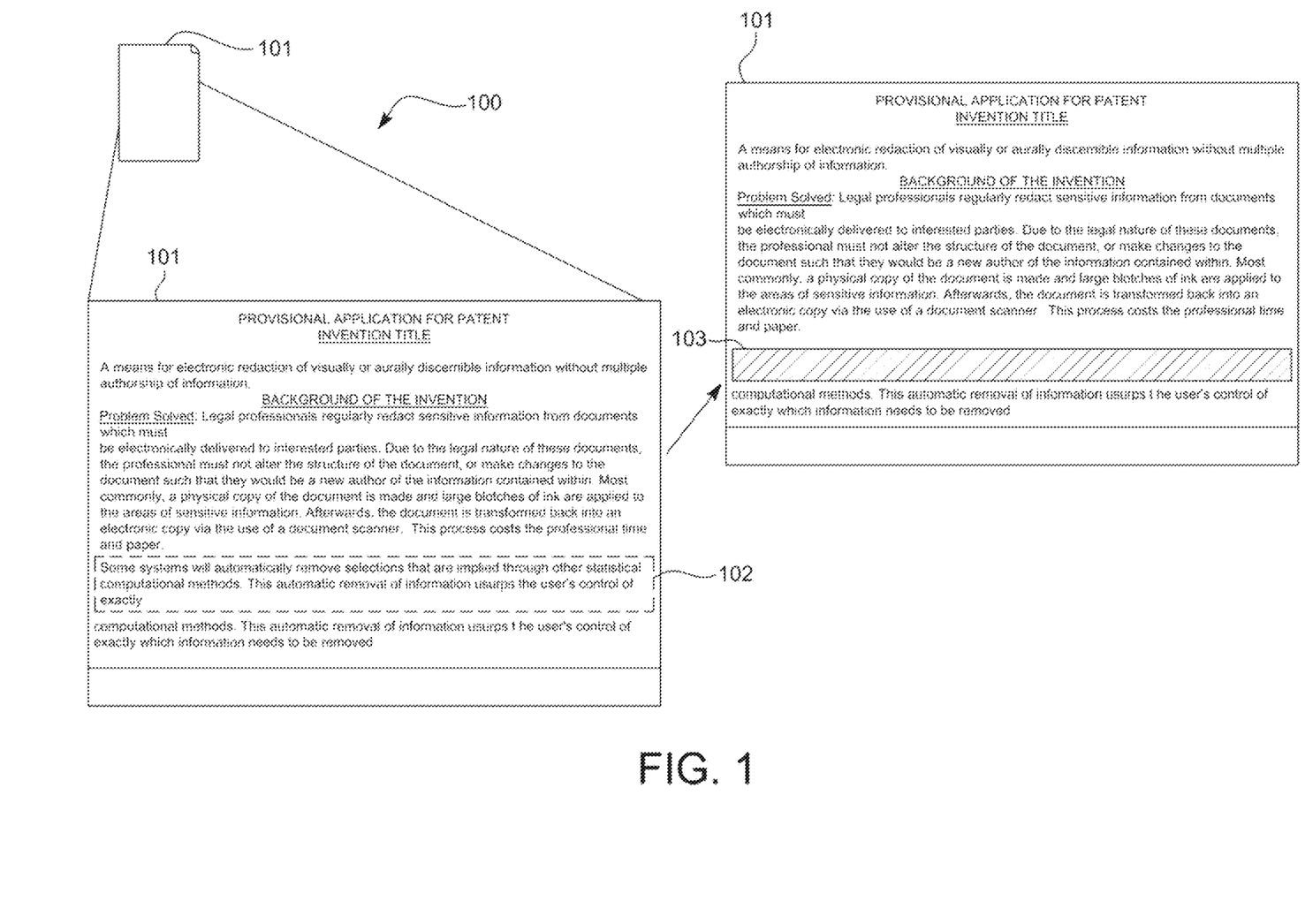
FIG. 1 illustrates an example embodiment for a system that provides a means for electronic redaction of visually or aurally discernible information without multiple authorship of information according to the present invention.

In general, the present disclosure relates to a system and method for redacting data from a digital file. To better understand the present invention, FIG. 1 illustrates an example embodiment for a system that provides a means for electronic redaction of visually or aurally discernible information without multiple authorship of information according to the present invention.

Legal professionals regularly redact sensitive information from documents 101 which must be electronically delivered to interested parties. Due to the legal nature of these documents 101, the professional must not alter the structure of the document or make changes 102 to the document 101 such that he/she would be a new author of the information contained within. Most commonly, a physical copy of the document is made and large blotches of ink 103 are applied to the areas of sensitive information.

Afterwards, the document 101 is transformed back into an electronic copy via the use of a document scanner. This process costs the professional time, money, and supplies. The present invention claimed herein addresses the limitations of existing solutions to this problem. By allowing the professional to visually select aurally or visually discernible information 102 contained within a document 101 for deletion, the document structure is preserved, and a single author of the document is maintained. Since this software is capable of accepting electronically formatted documents, there is no need for the professional to create a physical copy.

The present invention is an improvement on what currently exists. Some documents are legally required not to have multiple authors. By definition a redaction 103 is a removal of information; if it is recoverable it has not been removed. This invention provides complete binary removal of visually selected information such that it cannot be recovered, while not automatically removing inferred selections from a statistical computation, and does not allow for an edit that would alter the integrity of the document's authorship, all the while removing the need to create a physical copy of the original document.

The invention may use any type of network such as a single network, multiple networks of a same type, or multiple networks of different types which may include one or more of a direct connection between devices, including but not limited to a local area network (LAN), a wide area network (WAN) (for example, the Internet), a metropolitan area network (MAN), a wireless network (for example, a general packet radio service (GPRS) network), a long term evolution (LTE) network, a telephone network (for example, a Public Switched Telephone Network or a cellular network), a subset of the Internet, an ad hoc network, a fiber optic network (for example, a fiber optic service (often known as FiOS) network), or any combination of the above networks.

Smart devices mentioned herein the present application may also use one or more sensors to receive or send signals, such as wireless signals for example, Bluetooth™, wireless fidelity, infrared, Wi-Fi, or LTE. Any smart device mentioned in this application may be connected to any other component or smart device via wired communications (e.g., conductive wire, coaxial cable, fiber optic cable, ethernet cable, twisted pair cable, transmission line, waveguide, etc.), or a combination of wired and wireless communications. The invention's method and/or system may use a single server device or a collection of multiple server devices and/or computer systems.

The systems and methods described above, may be implemented in many different forms of applications, software, firmware, and hardware. The actual software or smart device application codes or specialized control software, hardware or smart device application(s) used to implement the invention's systems and methods is not limiting of the implementation. Thus, the operation and behavior of the systems and methods were described without reference to the specific software or firmware code. Software, smart device application(s), firmware, and control hardware can be designed to implement the systems and methods based on the description herein.

While all of the above functions are described to be provided to users via a mobile application on a smartphone, one of ordinary skill will recognize that any computing device including tablets, laptops, and general purpose computing devices may be used as well. In at least one embodiment, all of the services described herein are provided using web pages being accessed from the web server 201 using a web browser such as Safari™, Firefox™, Chrome™ DuckDuckGo™, and the like. All of the screen examples described herein show user interface elements that provide the functionality of the present invention. The arrangement, organization, presentation, and use of particular user input/ output (I/O) elements including hyperlinks, buttons, text fields, scrolling lists, and similar I/O elements are shown herein for example embodiments only to more easily convey the features of the present invention. The scope of the present invention should not be interpreted as being limited by any of these elements unless expressly recited within the attached claims.

For the purposes of the example embodiment of FIG. 1, various functions are shown to be performed on different programmable computing devices that communicate with each other over the Internet 105. These computing devices may include smartphones 101*a*, laptop computers 101*b*, tablets (not shown), and similar devices so long as the disclosed functionality of the mobile application described herein is supported by the particular computing device. One of ordinary skill will recognize that this functionality is grouped as shown in the embodiment for clarity of description. Two or more of the processing functions may be combined onto a single processing machine. Additionally, it may be possible to move a subset of processing from one of the processing systems shown here and retain the functionality of the present invention. The attached claims recite any required combination of functionality onto a single machine, if required, and all example embodiments are for descriptive purposes.

For all of the above devices that are in communication with each other, some or all of them need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects, and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method or algorithm is carried out or executed. Some steps may be omitted in some aspect or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example, an end-user computer system, a client computer, a network server or other server system, a mobile computing device (e.g., tablet computing device, mobile phone, smartphone, laptop or other appropriate computing device), a consumer electronic device, a music player or any other suitable electronic device, router, switch or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines or other appropriate virtual environments).

Figure 2A:
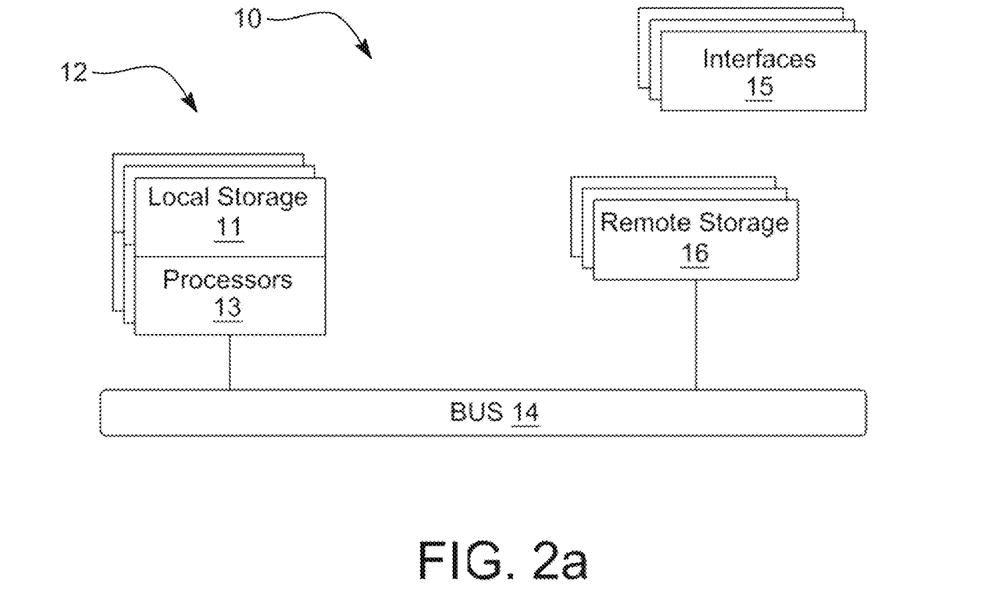
FIG. 2a is a block diagram illustrating an exemplary hardware architecture of a computing device.

Referring now to FIG. 2a, there is a block diagram depicting an exemplary computing device 10 suitable for implementing at least a portion of the features or functionalities disclosed herein. The computing device 10 may be, for example, any one of the computing machines listed in the previous paragraph, or indeed any other electronic device capable of executing software- or hardware-based instructions according to one or more programs stored in memory. The computing device 10 may be configured to communicate with a plurality of other computing devices, such as clients or servers, over communications networks such as a wide area network, metropolitan area network, local area network, wireless network, the Internet or any other network, using known protocols for such communication, whether wireless or wired.

In one aspect, the computing device 10 includes one or more central processing units (CPU) 12, one or more interfaces 15, and one or more buses 14 (such as a peripheral component interconnect (PCI) bus). When acting under the control of appropriate software or firmware, the CPU 12 may be responsible for implementing specific functions associated with the functions of a specifically configured computing device or machine. For example, in at least one aspect, a computing device 10 may be configured or designed to function as a server system utilizing a CPU 12, local memory 11 and/or remote memory 16, and interface(s) 15. In at least one aspect, a CPU 12 may be caused to perform one or more of the different types of functions and/or operations under the control of software modules or components, which for example, may include an operating system and any appropriate applications software, drivers, and the like.

A CPU 12 may include one or more processors 13 such as for example, a processor from one of the Intel, ARM, Qualcomm, and AMD families of microprocessors. In some aspect, processors 13 may include specially designed hardware such as application-specific integrated circuits (ASICs), electrically erasable programmable read-only memories (EEPROMs), field-programmable gate arrays (FPGAs), and so forth, for controlling operations of a computing device 10. In a particular aspect, a local memory 11 (such as non-volatile random access memory (RAM) and/or read-only memory (ROM), including for example, one or more levels of cached memory) may also form part of a CPU 12. However, there are many different ways in which memory may be coupled to a system 10. Memory 11 may be used for a variety of purposes such as, for example, caching and/or storing data, programming instructions, and the like. It should be further appreciated that a CPU 12 may be one of a variety of system-on-a-chip-(SOC) type hardware that may include additional hardware such as memory or graphics processing chips, such as a QUALCOMM SNAPDRAGON™ or SAMSUNG EXYNOS™ CPU as are becoming increasingly common in the art for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may, for example, support other peripherals used with a computing device 10. Among the interfaces that may be provided are ethernet interfaces, frame relay interfaces, cable interfaces, DSL interfaces, token ring interfaces, graphics interfaces, and the like. In addition, various types of interfaces may be provided such as, for example, universal serial bus (USB), serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast ethernet interfaces, gigabit ethernet interfaces, serial ATA (SATA) or external SATA (ESATA) interfaces, high-definition multimedia interfaces (HDMI), digital visual interfaces (DVI), analog or digital audio interfaces, asynchronous transfer mode (ATM) interfaces, high-speed serial interfaces (HSSI), point of sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 2a illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and a server system (such as a server system described in more detail below).

Regardless of network device configuration, the system of an aspect may employ one or more memories or memory modules (for example, remote memory block 16 and local memory 11) configured to store data, program instructions for the general-purpose network operations or other information related to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information or any other specific or generic non-program information described herein.

Because such information and program instructions may be employed to implement one or more systems or methods described herein, at least some network device aspects may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device) or they may be removable such as swappable flash memory modules (such as "thumb drives" or other removable media designed for rapidly exchanging physical storage devices), "hot-swappable" hard disk drives or solid state drives, removable optical storage disks, or other such removable media, and that such integral and removable storage media may be utilized interchangeably. Examples of program instructions include both object code, such as may be produced by a compiler, machine code, such as may be produced by an assembler or a linker, byte code, such as may be generated by for example by a JAVA™ compiler and may be executed using a JAVA™ virtual machine or equivalent, or files containing higher level code that may be executed by the computer using an interpreter (for example, scripts written in Python™, Perl™, Ruby™, Groovy™, or any other scripting language).

Figure 2B:
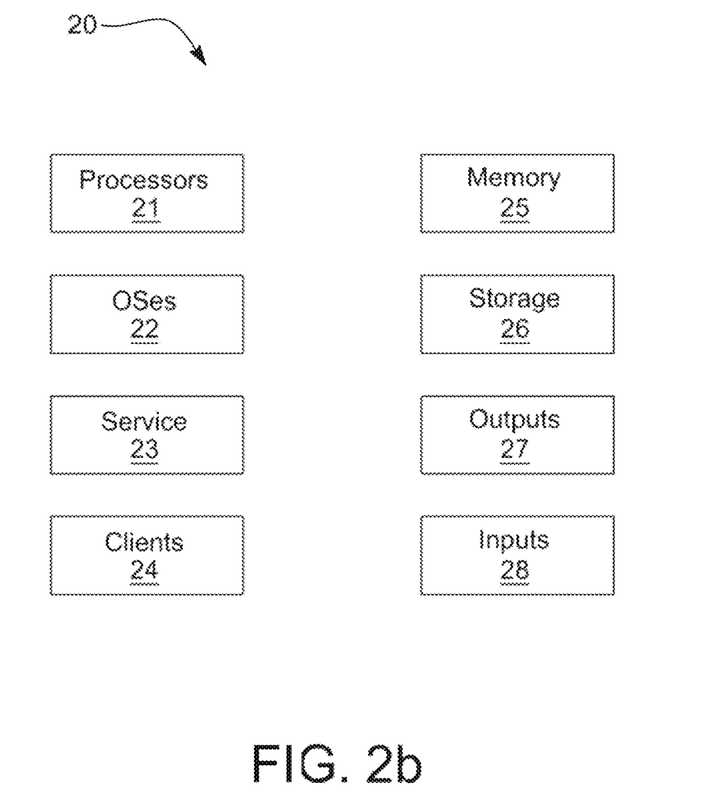
FIG. 2b is a block diagram illustrating an exemplary logical architecture for a client device.

In some aspects, systems may be implemented on a standalone computing system. Referring now to FIG. 2b, there is a block diagram depicting a typical exemplary architecture of one or more aspects or components thereof on a standalone computing system. A computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the LINUX™ operating system, ANDROID™ operating system, and the like. In many cases, one or more shared services 23 may be operable in a system 20 and may be useful for providing common services to client applications 24. Services 23 may, for example, be WINDOWS™ services, user-space common services in a LINUX™ environment or any other type of common service architecture used with an operating system 21. Input devices 28 may be of any type suitable for receiving user input including, for example, a keyboard, touchscreen, microphone (for example, for voice input), mouse, touchpad, trackball or any combination thereof. Output devices 27 may be of any type suitable for providing output to one or more users, whether remote or local to system 20, and may include, for example, one or more screens for visual output, speakers, printers or any combination thereof. Memory 25 may be RAM having any structure and architecture known in the art for use by processors 21, for example to run software. Storage devices 26 may be any magnetic, optical, mechanical, memristor or electrical storage device for storage of data in digital form (such as those described above, referring to FIG. 2a). Examples of storage devices 26 include flash memory, magnetic hard drive, CD-ROM, and the like.

Figure 2C:
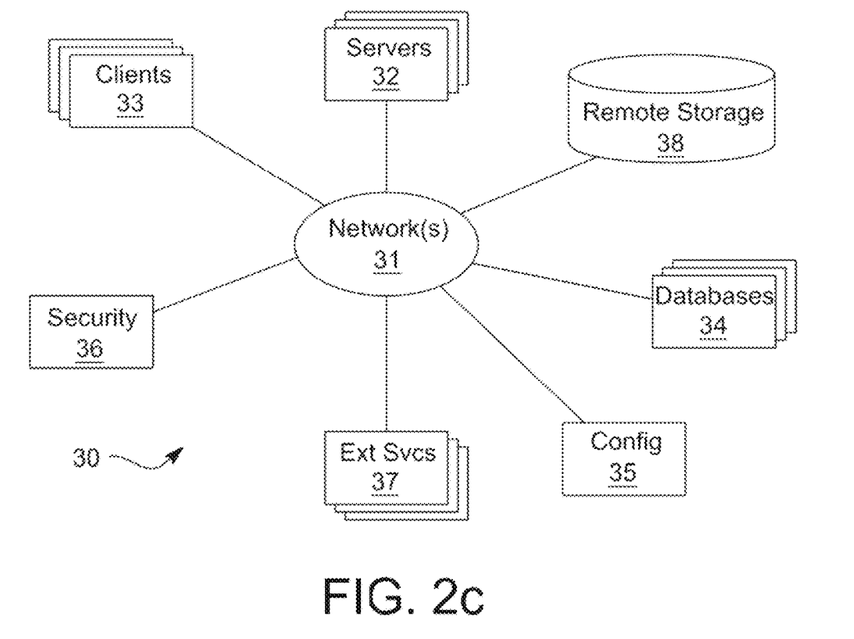
FIG. 2c is a block diagram showing an exemplary architectural arrangement of clients, servers, and external services.

In some aspects, systems may be implemented on a distributed computing network, such as one having any number of clients and/or servers. Referring now to FIG. 2c, there is a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in Fig. B. In addition, any number of servers 32 may be provided for handling requests received from one or more clients 33. Clients 33 and servers 32 may communicate with one another via one or more electronic networks 31, which may be in various aspects any Internet, wide area network, mobile telephony network (such as CDMA or GSM cellular networks), wireless network (such as WiFi, WiMAX, LTE, and so forth) or local area network (or indeed any network topology known in the art; the aspect does not prefer any one network topology over another). Networks 31 may be implemented using any known network protocols, including, for example, wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored on a server system 32 in the Cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and use a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web system. It should be understood by one having ordinary skill in the art that any configuration or security subsystems known in the art now or in the future may be used in conjunction with aspects without limitation, unless a specific security 36 or configuration system 35 or approach is required by the description of any specific aspect.

Figure 2D:
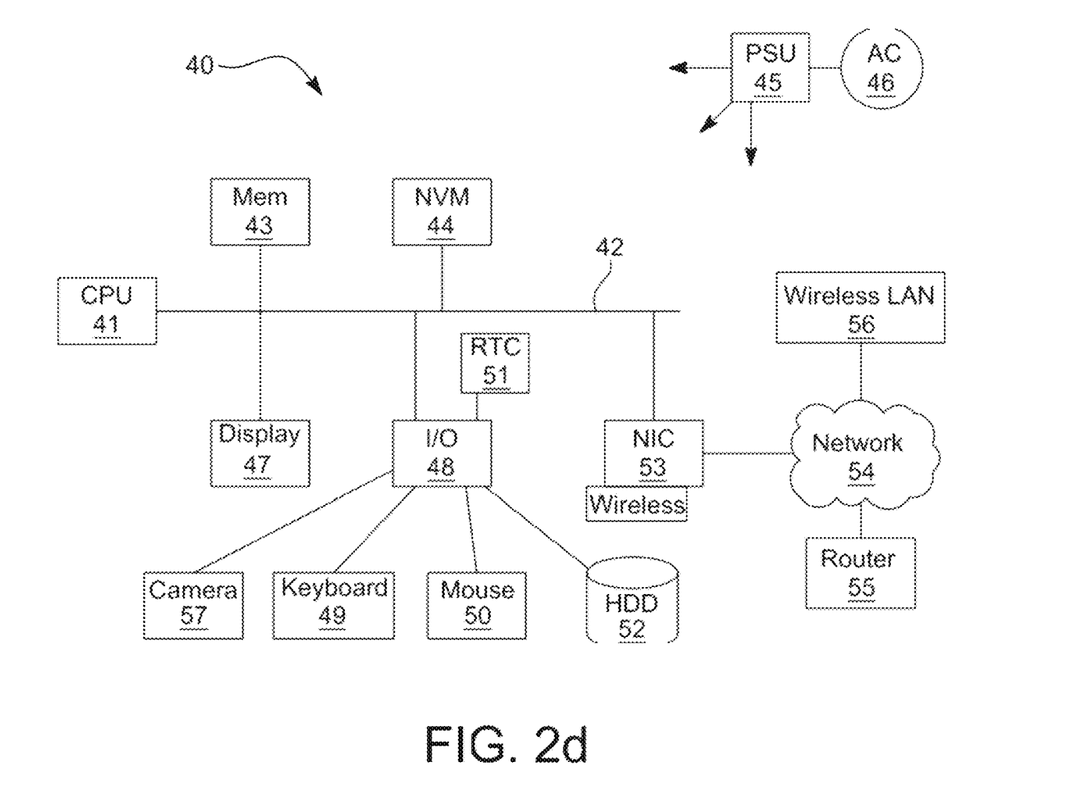
FIG. 2d is another block diagram illustrating an exemplary hardware architecture of a computing device.

FIG. 2d shows an exemplary overview of a computer system 40 as may be used in any of the various locations throughout the system. It is exemplary of any computer that may execute code to process data. Various modifications and changes may be made to a computer system 40 without departing from the broader scope of the system and method disclosed herein. A CPU 41 is connected to a bus 42, to which a bus is also connected to memory 43, nonvolatile memory 44, display 47, I/O unit 48, and network interface card (NIC) 53. An I/O unit 48 may, typically, be connected to peripherals such as a keyboard 49, pointing device 50, hard disk 52, real-time clock 51, camera 57, and other peripheral devices. A NIC 53 connects to a network 54, which may be the Internet or a local network, which local network may or may not have connections to the Internet. The system may be connected to other computing devices through the network via a router 55, wireless local area network 56 or any other network connection. Also shown as part of a system 40 is a power supply unit 45 connected, in this example, to a main alternating current (AC) supply 46. Not shown are batteries that could be present and many other devices and modifications that are well known, but are not applicable to, the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles or other integrated hardware devices).

In various aspects, functionality for implementing systems or methods of various aspects may be distributed among any number of client and/or server components. For example, various software modules may be implemented for performing various functions in connection with the system of any particular aspect, and such modules may be implemented to run on server and/or client components.

Figure 3:
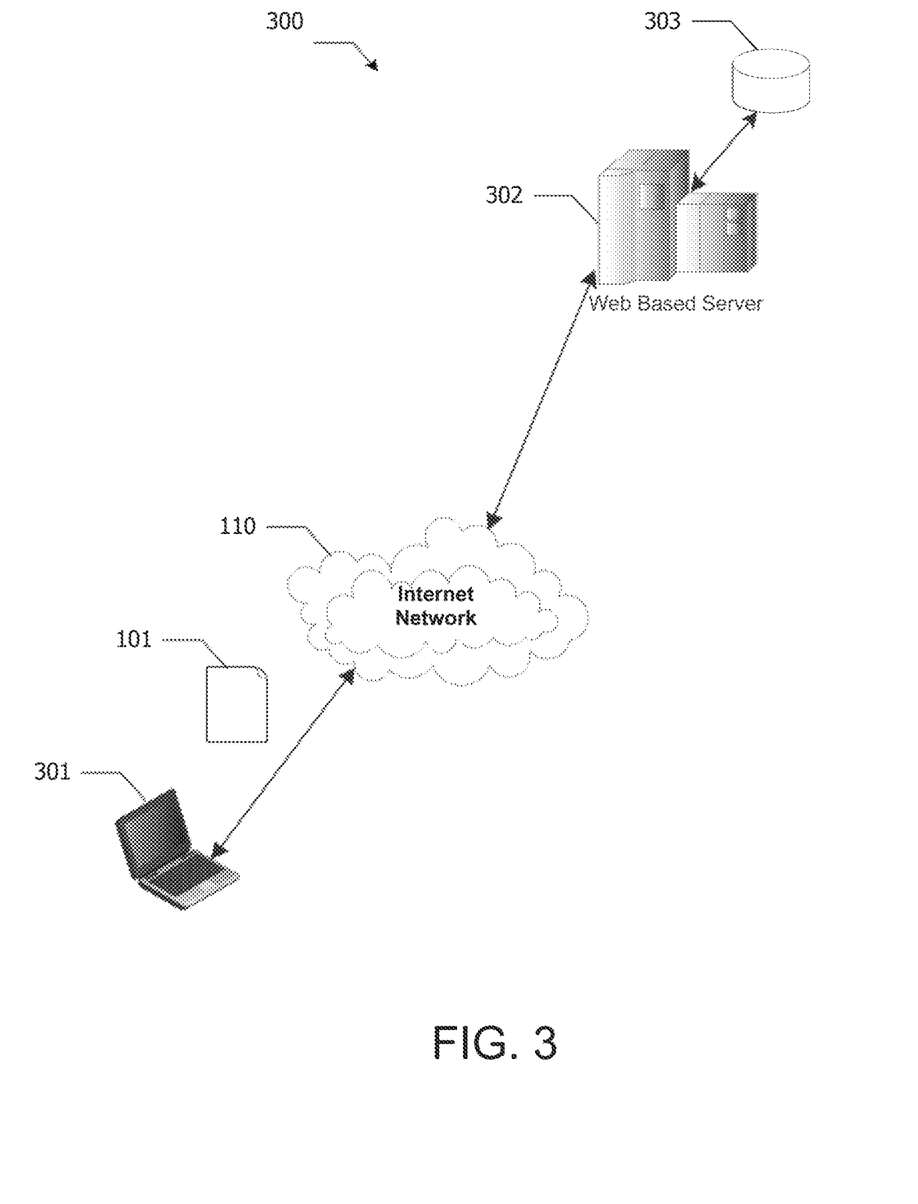
FIG. 3 illustrates another example embodiment of a system for providing a means for electronic redaction of visually or aurally discernible information without multiple authorship of information according to the present invention.

FIG. 3 illustrates another example embodiment of a system for providing a means for electronic redaction of visually or aurally discernible information without multiple authorship of information according to the present invention. A user, working on a local computing device 301, processes a document 101 to select data to be redacted from the document. The data is digitally removed from the document 101 and replaced with digital data that maintains the structure and arrangement of data remaining in the document.

In order to ensure the integrity of the legal document 101, the system typically segregates the processing elements from a user's computing device 301 that requires an authorized account to perform the redactions to a document 101. The user is authenticated by the system 302 using a user ID and password combination before the document 101 may be altered. In some other embodiments, the user authentication may require multi-factor authentication in which a one-time access code is sent from the system 302 to the user via a previously defined mechanism such as a SMS or email message. The user is required to enter the one-time access code as part of the authentication process ensuring the user performing the data redaction using the system 302 is permitted and recognized for record audit trails.

In the embodiment of FIG. 3, the system 302 that performs the redaction is physically remote from a user computing device 301. The user uploads a document 101 to be processed to the remote system 302 via the Internet 110 after being successfully logged into the server 302. The user may then select the data to be redacted within the document 101. Once all of the data to be redacted are selected, the remote server 302 processes the document 101 to delete the selected data and replace it with a digital representation of the data redaction while maintaining the structure and organization of the contents of the digital data file. The authorship of the document, as maintained within the document 101, is not altered. The redacted file 103 is returned to the user once the processing has completed.

Figure 4:
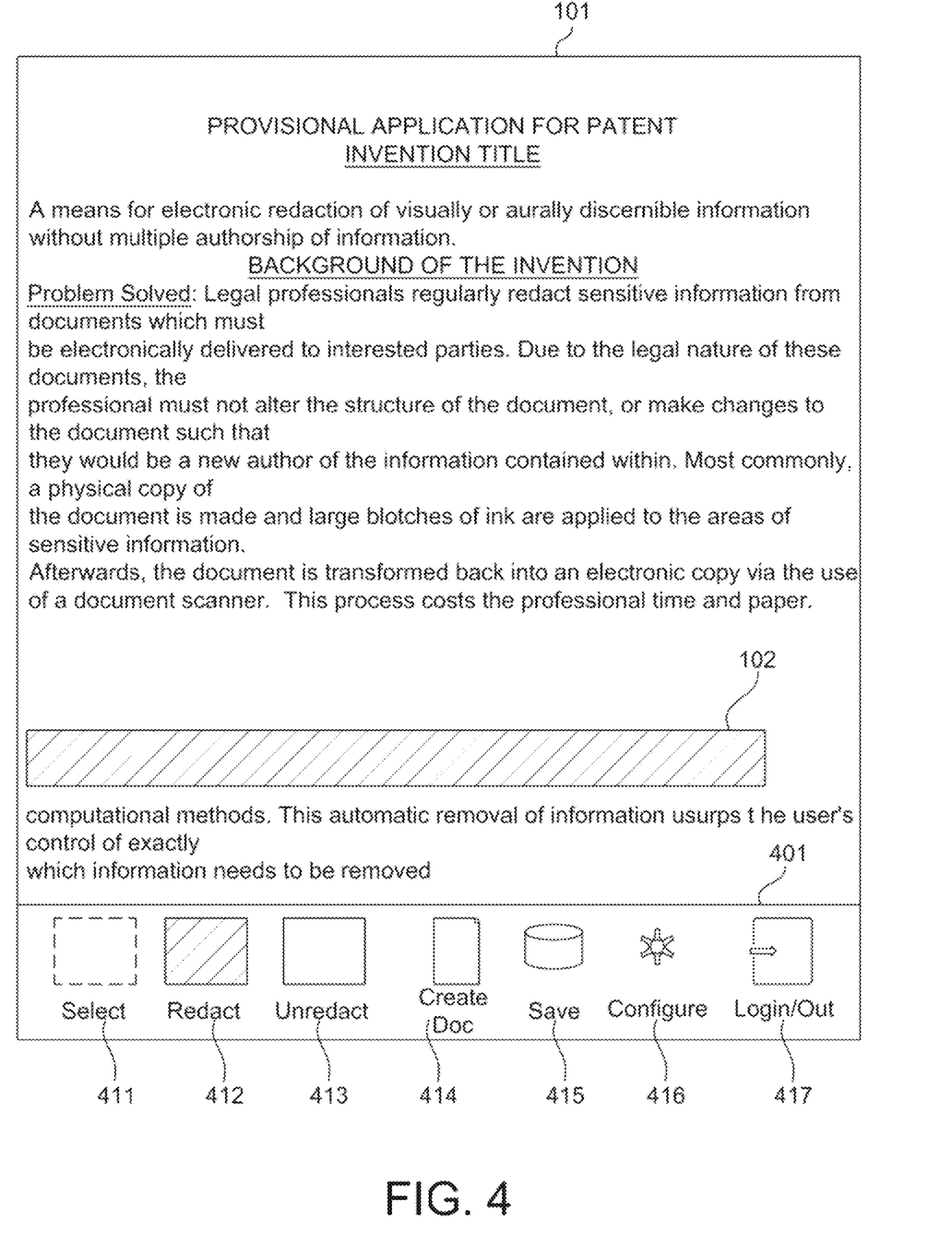
FIG. 4 illustrates an example of a digital file having a portion of its contents redacted using a system according to an example embodiment of the present invention.

FIG. 4 illustrates an example of a digital file having a portion of its contents redacted using a system according to an example embodiment of the present invention. In this embodiment, a digital document 101 is presented to a user for redaction. The user is presented with a visual representation of the file as it is rendered when viewed or printed. The user is presented with a toolbar 401 of redaction tools for use to select and redact contents of the document 101.

The document 101 may be organized in a plurality of data formats where the most prominent formats include a Portable Document Format (PDF) from Adobe™ or the Microsoft Word™ document format (DOC or DOCX). The system 100 accepts a document file for processing and generates a redacted file containing its contents with any redacted data removed. The contents are stored within the redacted file 103 in the same format as the original file and the deleted data is replaced with a digital representation of the redaction that uses the same amount of space when the document is rendered for viewing or printing. The PDF file format is used in many applications in that the file format includes layout and margin information permitting the document 101 to be rendered in the same form regardless of the application using the file. Insertion of the digital representation of the redaction may use this formatting and layout information to correctly size and position the digital representation of the redaction in the location where the original content was located. When a DOC or DOCX file is utilized, the system must process the redacted content to first determine where the deleted information was located when the file is rendered or printed, determine the space required by the data to be deleted when it was rendered, and then use the above calculated values to insert the digital representation of the redaction while using the same amount of space when rendered.

In other embodiments, the system 100 may render a document 101 as a bit map of high resolution images similar to the ink printing dots that are placed onto paper by an inkjet or laser printer. When content in selected for redaction, the pixels from the high resolution image representation of the document 101 are selected and deleted. When the redaction process ends, the high resolution image of the document pages may be converted into a viewable or printable version of the document 101.

When a user of a redaction processor 302 wishes to redact content from the file, the user may choose one of the tools from the toolbar of FIG. 4 for processing. The toolbar may include separate redaction tools including a select tool 411, a redact tool 412, an unredact tool 413, a create document tool 414, a save tool 415, a config tool 416, and a login/lout out tool 417. The select tool 411 is used when a user wishes to select content 102 from the document 101 to be redacted or unredacted.

The redact tool 412 is used to convert selected content from an unredacted state to a redacted state. The unredact tool 413 is used to convert selected redacted content from the redacted state to an unredacted state. While the system 100 is being used to select and redact content from the document 101, the content may be maintained in its original form found in its original document file 101. The redaction processor 302 marks the content to be in the redacted or unredacted state based upon the user's use of the above tools. Once the user is finished the process, the user may use the create document tool 414 to render the document file 101 to a final redacted state.

The create document tool 414 is needed to ensure the removal of the redacted content from the document 101 such that the removed content may not be recovered by parties who receive the redacted form of the document. If the redacted content was left within the redacted version of the document 103, unauthorized users may be able to attempt to restore the redacted content. The only way to ensure that recovery of the redacted data is not possible is to create a new document that contains only the unredacted content and the digital representation of the redacted data.

The save tool 415 is used to update a redacted file once additional content has been selected for removal. The first time a document 101 has content redacted, the create a new redacted document tool 414 is used. This creates an initial version of the redacted file. Once the redacted document has been created, the save document tool 415 may be used to save additional redactions to the redacted file. Once content has been redacted using either the create a redacted document tool 414 or the save tool 415, the redacted content has been lost and cannot be restored without use of the original unredacted version of the document 101.

The config tool 416 may be used to set parameters and preference values used by the system 100 when processing documents 101. These preference values may include default file locations used in processing, default file formats used, resolution of bit map images used by the redaction processor 302, and similar parameters used by the redaction processor 302. The login/lout out tool 417 is used by a user to begin and terminate a redaction session that requires authentication of the user's identity before the system 100 may be used.

In an alternate embodiment, the original document 101 is a digital audio file. The redaction processor 302 provides an ability for a user to upload the audio file, listen to the contents of the audio file, to select portions of the audio data stream for redaction, and replacing the selected audio data with a digital representation of white noise for an identical length of time corresponding to the selected audio data. The redacted file generated by redaction processor 302 and returned to the user computer 301 is also an audio file. The process is otherwise identical to the above process to redact text and graphic content from a printable document.

Figure 5:
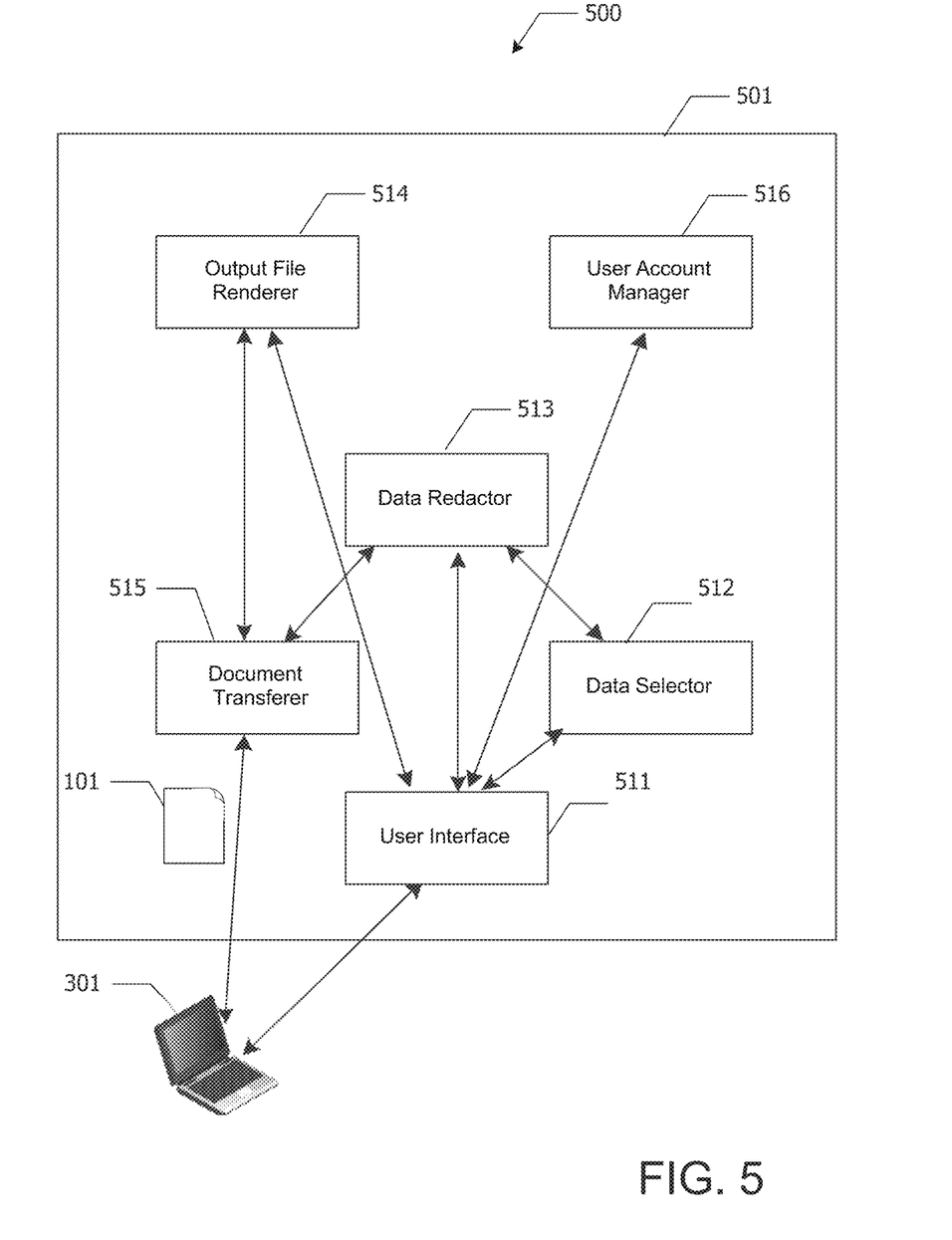
FIG. 5 illustrates a computing system of software components providing a means for electronic redaction of visually or aurally discernible information without multiple authorship of information according to the present invention.

FIG. 5 illustrates a computing system of software components providing a means for electronic redaction of visually or aurally discernible information without multiple authorship of information according to the present invention. A web server based system 501 may be constructed using a set of processing elements 511-516 to implement the content redaction processing. The set of processing elements include a user interface 511, a data selector 512, a data redactor 513, an output file renderer 514, a document transferer 515, and a user account manager 516. These processing elements 511-516 function together to implement the system 100 disclosed herein.

The user interface 511 provides the toolbar 401 and the various tools 411-416 for the user to interact with a document 101 using the system 100. The user interface 511 may implement a web server interface as well that permits a remote computer 301 to access the web server 302 that is used to implement the system 100. The user interface 511 also provides any communication operations needed for a remote computer 301 to interact with the system 100.

The data selector 512 processes user inputs to perform the functions of the select tool 411 within system 100. All user input commands from input devices such as a keyboard, mouse, trackpad, touchscreen, and the like are processed within the data selector 512 as a user specifies content to be redacted.

The data redactor 513 processes the user inputs to support the functions of the redact tool 412 and unredact tool 413 within system 100. The data redactor 513 marks any content as being in a redacted and unredated state as specified by the user. The data redactor 513 also generates the digital representation of the redacted content for insertion into the document 101 to maintain the documents structure and presentation of the content.

The output file renderer 514 is used to create a redacted file and save updates to a redacted file as commanded by a user via the create a redacted document tool 414 or the save tool 415 as disclosed above.

The document transferer 515 processes user commands to import a document 101 for redaction from a remote user computing system 301 and to transfer a generated redacted file back to the user's remote computing system when completed. The document transferer 515 operates only after the user account manager 516 has authenticated the user and authorized his/her use of the system 100.

The user account manager 516 is responsible for authenticating and authorizing a user's access to the system 100 to process documents. The user account manager 516 creates user accounts upon request of an administrator which causes the creation of a user ID and initial password. Any user specific information, such as a mobile phone number or an email address, used as part of a multi-factor authentication process may be entered into the user account when it is created. The user account manager 516 performs all user authentication and authorization processing each time a user establishes a session to process documents to redact content.

Figure 6:
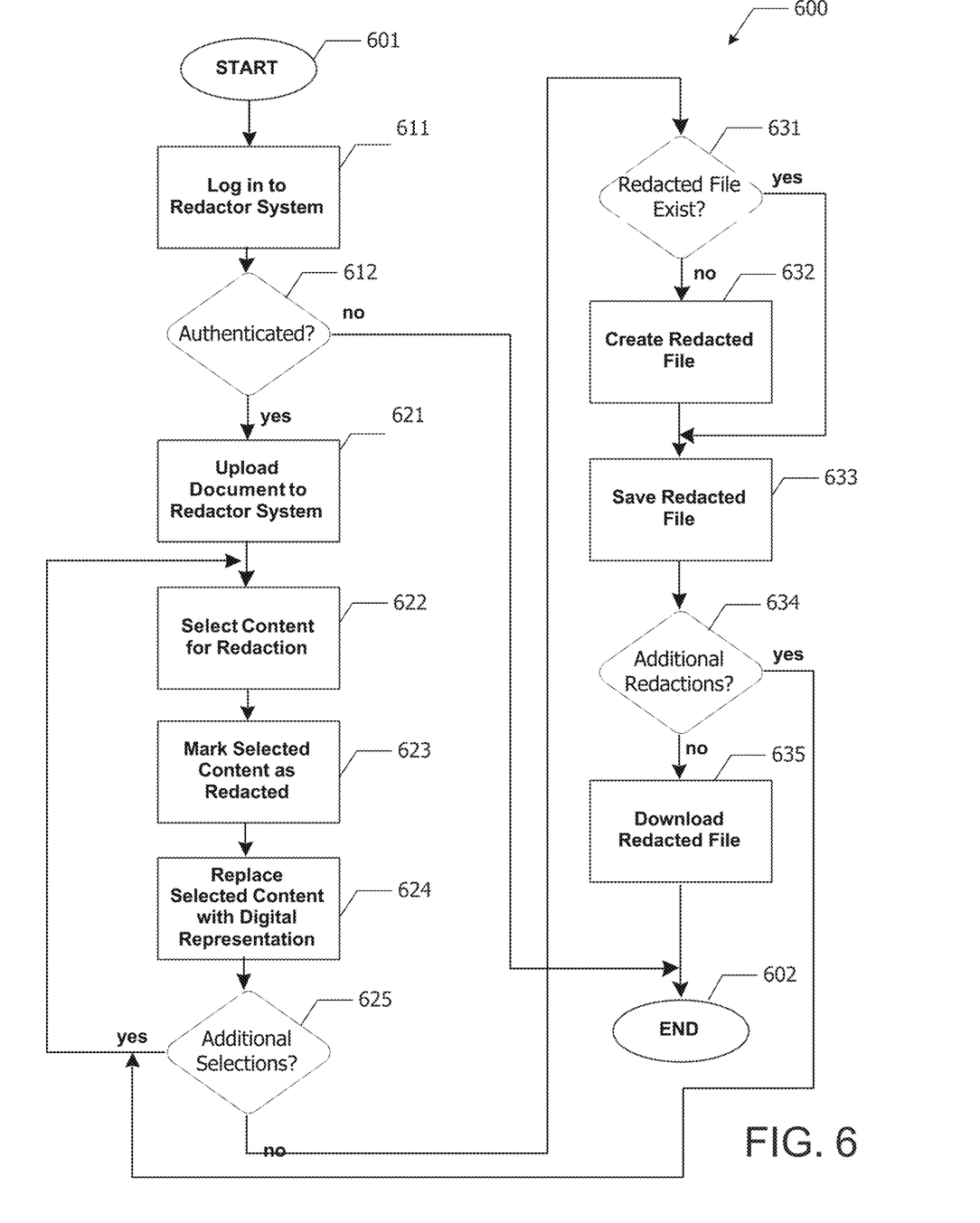
FIG. 6 illustrates a flowchart corresponding to a method performed by software components providing a means for electronic redaction of visually or aurally discernible information without multiple authorship of information according to the present invention.

FIG. 6 illustrates a flowchart corresponding to a method performed by software components providing a means for electronic redaction of visually or aurally discernible information without multiple authorship of information according to the present invention. The process 600 begins 601 when a user attempts to log into the remote redaction system 302 in step 611. Test step 612 determines whether the user has been authenticated using a user ID/password combination and possibly a multi-factor authentication process; and if not, the process immediately ends 602.

When test step 612 determines that the user has been successfully authenticated, a document 101 to be redacted is uploaded to the remote redaction system 302 in step 621. A user selects content from within document 101 in step 622 for redaction. Step 623 marks the selected content as being redacted before step 624 generates and replaces the selected content with a digital representation of the redacted content to maintain the structure and layout of the content within document 101. Test step 625 determines whether additional content is to be selected for redaction, and if so, the process returns to step 622 to select an additional set of content.

When test step 625 determines that no additional content is to be selected at this time, test step 631 determines whether a redacted version of the document 103 has been created as part of a document save process. If the redacted version of the document has not been created, step 632 creates a new file to receive the redacted document 103 without any of the redacted content. Once the file exists, the current set of redacted document data, including remaining original content and the replacement digital representation of the redacted content is saved into the redacted document 103 in step 633. Test step 634 determines whether the user wishes to select additional content for redaction, and if so, the process returns to step 622 to select and mark the additional content for redaction. When test step 634 determines that no additional redactions are to be performed, the saved redacted document 103 is downloaded from the remote redaction system 302 to the user computer 301 in step 635 and the process ends 602.

The embodiments described herein are implemented as logical operations performed by a computer. The logical operations of these various embodiments of the present invention are implemented (1) as a sequence of computer-implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

In the present application, all or any part of the invention's software or application(s) or smart device application(s) may be installed on any of the user's or operator's smart device(s), any server(s) or computer system(s) or web application(s) required to allow communication, control (including but not limited to control of parameters, settings such as for example, sign copy brightness, contrast, ambient light sensor settings . . . etc.), transfer of content(s) or data between any combination of the components.

What is claimed:

1. A system for providing a means for electronic redaction of visually or aurally discernible information without multiple authorship of information, the system comprising:
   a data selector for selecting a portion of content from within an original document for redaction;
   a data redactor for marking the portion of content from within the original document selected for redaction as being redacted and for generating a digital representation of the redacted data for maintaining the structure and layout of the original document when replacing the portion of content from within the original document selected for redaction, the content having a specific amount of space and an original location within original document and the digital representation of the selected content that uses the same amount of space when the selected content is rendered for viewing or printing; and
   an output document file rendered for generating a redacted document by replacing the selected content for redaction with the digital representation of the selected content within the document to generate a redacted document, the redacted document does not retain a recoverable version of the redacted content from the original document;
   wherein redaction of selected content being a complete binary removal of visually selected information such that it cannot be recovered, while not automatically removing inferred selections from a statistical computation.

2. A method for providing a means for electronic redaction of visually or aurally discernible information without multiple authorship of information, the method comprising:
   uploading an original document to a redaction processor;
   selecting content from within the original document for redaction, the content having a specific amount of space and an original location within original document;
   marking the selected content for redaction;
   generating a digital representation of the selected content for redaction, the digital representation of the selected content that uses the same amount of space located at original location when the selected content is rendered for viewing or printing;
   replacing the selected content for redaction with the digital representation of the selected content within the original document to generate a redacted document, the redacted document removes the redacted content from the original document;

downloading the redacted document from the redaction processor;

wherein redaction of selected content being a complete binary removal of visually selected information such that it cannot be recovered, while not automatically removing inferred selections from a statistical computation.

3. The method according to claim 2, wherein the method further comprises logging into the redaction processor before the original document is uploaded.

4. The method according to claim 3, wherein the logging into the redaction processor utilizes a multi-factor authentication process.

5. The method according to claim 2, wherein the original document is a portable document format (PDF) file.

6. The method according to claim 2, wherein the original document is a word processing document format file.

7. The method according to claim 2, wherein the redacted document is a portable document format (PDF) file.

8. The method according to claim 2, wherein the redacted document is a bit map image file.

9. The method according to claim 2, wherein the original document is a digital audio file.

10. The method according to claim 2, wherein the redacted document is a digital audio file.

* * * * *